Sept. 6, 1960     I. C. McKECHNIE     2,951,930
PULSED ARC MACHINING
Original Filed Feb. 5, 1954

INVENTOR.
Ian C. McKechnie.
BY Maxwell K. Murphy
ATTORNEY.

United States Patent Office 2,951,930
Patented Sept. 6, 1960

2,951,930

PULSED ARC MACHINING

Ian C. McKechnie, Detroit, Mich., assignor to Elox Corporation of Michigan, a corporation of Michigan Continuation of application Ser. No. 408,401, Feb. 5, 1954. This application Feb. 26, 1958, Ser. No. 717,649

10 Claims. (Cl. 219—69)

This invention relates to the art of arc-machining, sometimes referred to as "metal disintegrating," "spark-machining," or "electrical-discharge-machining."

Originally, arc-machining apparatus was powered with A.C. power, but quite early in the development of the art, it was discovered that polarizing of the electrode negatively with respect to the workpiece resulted in improved results. See U.S. patent to McKechnie et al., 2,501,954, issued March 28, 1950. When an electrical discharge occurs, current flows across the gap, this current flow consisting mostly of electrons flowing from the negative electrode to the positively charged workpiece. These electrons are minute, high-velocity particles, and their impingement on the surface of the work causes high molecular activity, with consequent rapid rise in temperature. The area of the work thus bombarded vaporizes, then instantly condenses into small, positively ionized particles which leave the work surface. Most of these particles are carried away by the coolant, but a considerable number impinge on the negative electrode, attracted thereto by electrostatic attraction, and thus the surface of the electrode is vaporized and worn away.

While wearing away of the electrode tool generally is not nearly as rapid as the erosion of the workpiece, replacement of worn or badly eroded electrodes is expensive, particularly in cases where specially fabricated electrodes of irregular shape are used.

This application is a continuation of my co-pending application Serial No. 408,401, filed February 5, 1954, now abandoned.

I have found that a large percentage, if not all, of the positive particles which impinge on the electrode can be prevented from so doing by instantaneously reversing the polarity of the gap for a short period after each discharge. Immediately that the tool (electrode) becomes positive, positively charged particles in the gap are repelled therefrom and are carried away by the coolant. For optimum results, the reverse-polarity-voltage should be of lower magnitude than that required to cause a discharge across the gap, or if the reverse-polarity-voltage is of the same value as the discharge-voltage it should be effective for an extremely short interval—less than the time required to break down the gap.

Accordingly it is the primary object of my invention to provide an improved method and apparatus for arc-machining whereby electrode erosion is either eliminated or substantially decreased.

A further object is to provide in an arc-machining apparatus means for rapidly reversing the polarity of the gap after each discharge for the purpose described.

A still further object is to provide means in such an apparatus for reversing the gap polarity under conditions such that a discharge will not occur while the gap is reversely polarized.

Another object is to provide means for reversing the gap polarity after each eroding discharge either at a sufficiently low voltage or for a sufficiently short time interval such that discharge will not occur while the gap is reversely polarized.

Another object is to provide a simple circuit for accomplishing the desired reversal of polarity which includes coupling the pulse circuit to the gap through a transformer of suitable characteristics such that the voltage induced in the secondary of the transformer in response to collapse of flux in the primary fires the gap.

Other objects and advantages of the invention will be apparent from the following description which, taken in conjunction with the accompanying drawing, discloses preferred forms of my invention.

In the drawings in which reference characters designate like parts referred to in the specification:

Figure 1:
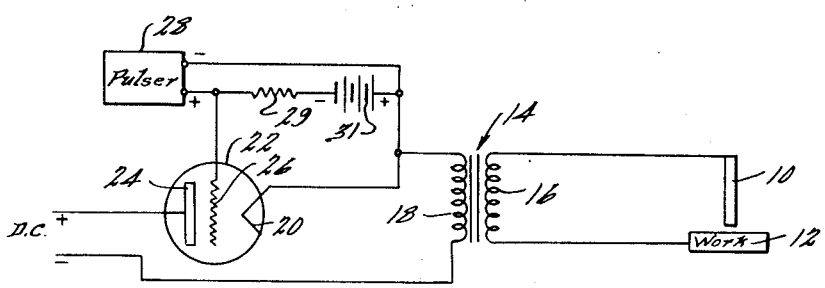
Fig. 1 is a schematic diagram of a circuit and apparatus for practicing my invention.

Referring to Fig. 1, I have shown an electrical-discharge machining circuit including an electrode 10 and a workpiece 12. The electrode may or may not be reciprocated during operation of the apparatus and is preferably fed toward the work by means of an automatically controlled servo-mechanism, such as is shown in McKechnie U.S. Patent 2,588,744, issued March 11, 1952, and McKechnie U.S. applications Serial No. 209,976 and Serial No. 260,002, both now abandoned.

This circuit, which may be termed a pulse-transformer-type circuit, includes a transformer 14 having a secondary 16 connected across the gap between the electrode and workpiece, and a primary 18, one side of which is connected to the cathode 20 of a vacuum tube 22 and the other side of which is connected to the negative terminal of a D.C. source. The anode 24 of the tube 22 is connected to the positive terminal of the D.C. source, and the grid thereof is connected to the positive output terminal of pulser 28. A grid resistor 29 and a grid bias voltage 31 are connected across the grid and cathode as shown.

Figures 2, 3:
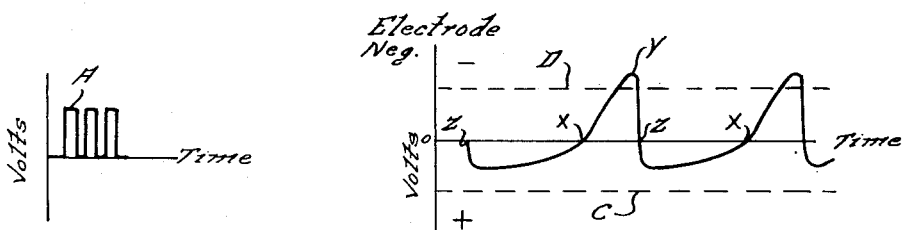
Fig. 2 is a graphical representation of the signal impressed on the Fig. 1 circuit by the pulser element thereof.
Fig. 3 is a graphical representation of the voltage-time relationship existing in the Fig. 1 circuit.

The pulser 28 is suitably supplied with power and is adjusted to impress on the grid 26 positive pulses of extremely short duration thereby rendering the circuit to the transformer primary 18 alternately conductive and non-conductive. Fig. 2 graphically illustrates the signal received by the grid 22 from the pulser 28, and Fig. 3 graphically illustrates the gap voltage characteristic for each individual discharge. Buildup of voltage in the primary 18 when the circuit of Fig. 1 is rendered conducting by means of a pulse A (Fig. 2) received from the pulser 28 induces a voltage in the secondary 16 which is represented by the curve ZX in Fig. 3. Here the portion of the curve XYZ shows the magnitude of the voltage pulse when the electrode 10 is negative with respect to the workpiece 12, during which time this voltage exceeds that required to break down the gap. The dotted line "D" indicates the magnitude of voltage required to break down the gap and, of course, the gap fires. The portion of the curve ZX shows the magnitude of the voltage pulse when the electrode 10 is positive with respect to the workpiece 12, during which time the voltage remains less than that required to break down the gap as shown by the dotted line "C." No gap breakdown occurs, but the positive particles previously given off by the preceeding reverse polarity pulse are now repelled from the electrode 10 by the electrostatic field.

The pulse A is of extremely short duration and the tube 22 is accordingly conductive for a short interval only, then instantly becomes non-conductive, whereupon the flux in the transformer 14 being unsustained collapses rapidly. This rapid collapse of the flux induces a voltage in secondary 16 of opposite polarity and greater magnitude. As shown by the portion of curve XYZ in Fig. 3, the magnitude of the voltage is sufficient to cause a discharge across the gap.

The grid 26 then receives another pulse from the pulser and the cycle is repeated with the result that a series of material-removing discharges occur between the electrode and the workpiece when the electrode is negative, and because the polarity of the electrode is instantly reversed after each discharge, particles of metal dislodged from the workpiece are repelled by the electrode which is thereby protected from wear and damage.

As may be seen from Figs. 2 and 3, while the pulse A is of short duration, the interval between pulses is still shorter in duration and the transformer design is such that the collapse of flux in the primary in response to the pulse A being cut off sharply is rapid enough to induce a secondary voltage considerably greater in magnitude than that induced by the pulse.

Figure 4:
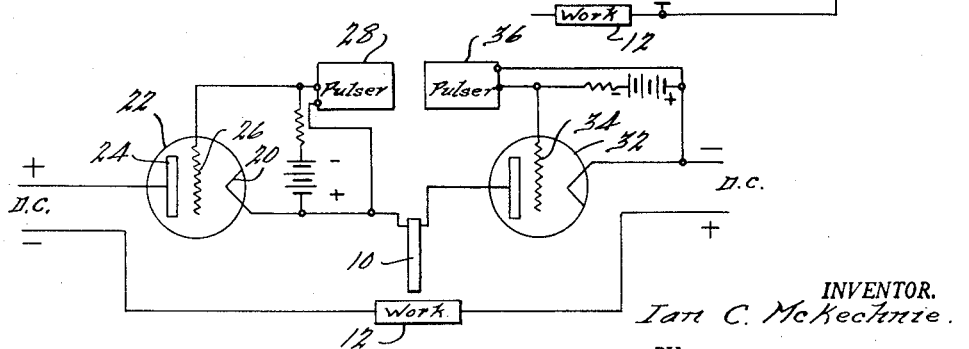
Fig. 4 is a schematic diagram of a modified circuit and apparatus for practicing the invention.

Fig. 4 shows a modified circuit wherein the transformer is replaced by a second vacuum tube, the grid 34 of which is controlled by a second pulser 36. Two separate sources of D.C., of opposite polarity, are used, one source being connected negatively to the electrode and the other positively connected. The voltage source connected to the electrode 10 through tube 32 is sufficiently high in magnitude to break down the gap and cause a discharge thereacross. The voltage source connected to the electrode through the tube 22 is of lower magnitude and insufficient to break down the gap. Alternately, if desired, the voltage source through tube 22 may be of the same or higher magnitude than the other source and the pulse time made so short that no gap breakdown and consequently no discharge takes place. By proper adjustment of the pulsers 28 and 36, the tubes 22 and 32 are rendered alternately conductive and voltages of opposite polarity are impressed across the gap.

Figure 5:
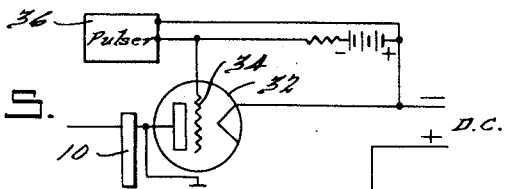
Fig. 5 is a diagram of a modification of the Fig. 4 circuit.

Fig. 5 shows circuit of Fig. 4 with the addition of a condenser across the electrode to workpiece gap. Here the action in the circuit is the same as previously stated except that the tube current first accumulates in the condenser until the condenser voltage rises sufficiently to cause gap breakdown. When the de-ionizing or reverse polarity tube is conducting on the next half cycle, however, the condenser voltage rise must be limited to prevent gap breakdown.

It may thus be seen that I have provided a simple method and apparatus for substantially eliminating electrode wear and damage in arc-cutting machines.

I claim:

1. In an apparatus for removing material from a workpiece by means of electrical discharge across a gap between an electrode and the workpiece, means for impressing a voltage across said gap of sufficient magnitude to cause a discharge thereacross with the electrode negative and the workpiece positive, and means for repelling dislodged workpiece particles from the electrode including means for alternately impressing a voltage across said gap of opposite polarity and lower magnitude.

2. In an apparatus for removing material from a workpiece by means of electrical discharge across a gap between an electrode and the workpiece, means for impressing a voltage across said gap of sufficient magnitude and for a sufficient period of time to cause a discharge thereacross, and means for repelling dislodged workpiece particles from the electrode including means for reversing the polarity of said voltage for a period of time less than that required to cause a discharge.

3. Apparatus for machining conductive workpieces by means of electrical discharge between an electrode and a workpiece comprising, an electrode, a vacuum tube having its cathode connected to said electrode and its anode connected to the positive terminal of a D.C. source, a second vacuum tube having its anode connected to said electrode and its cathode connected to the negative terminal of a second D.C. source of higher voltage than said first source, conductors connecting the workpiece with the negative and positive terminals respectively of said D.C. sources, a pulser connected to the grid of said first tube, a second pulser connected to the grid of said second tube, said pulsers being adjusted to render said first tube conductive when said second tube is non-conductive and vice versa.

4. The combination set forth in claim 3, wherein a condenser is connected across the gap between the electrode and workpiece.

5. Apparatus for machining conductive workpieces by means of electrical discharge between an electrode and a workpiece comprising, an electrode, a vacuum tube having its cathode connected to said electrode and its anode connected to the positive terminal of a D.C. source, a second vacuum tube having its anode connected to said electrode and its cathode connected to the negative terminal of a second D.C. source, conductors connecting the workpiece with the negative and positive terminals respectively of said D.C. sources, a pulser connected to the grid of said first tube, a second pulser connected to the grid of said second tube, said pulsers being adjusted to render said first tube conductive when said second tube is non-conductive and vice versa, and the pulser controlling said first vacuum tube being adjusted to provide pulses of such short duration that no discharge can take place across the gap between the electrode and workpiece.

6. In an electrical discharge machining apparatus, means for causing intermittent discharge across a gap between an electrode and a workpiece whereby the workpiece is eroded, and means for minimizing wear of the electrode caused by impingement of eroded particles comprising means for impressing across the gap a voltage of opposite polarity and lower magnitude between erosive discharges.

7. In an electrical discharge machining apparatus having an electrode and a workpiece disposed in gap relationship, a power unit for supplying intermittent erosive discharges of selected polarity and magnitude to the machining gap and for supplying to the gap a voltage of opposite polarity and lower magnitude between said erosive discharges for repelling dislodged workpiece particles from the electrode comprising, a transformer having its secondary winding connected across the gap and its primary winding connected to source of D.C. power, pulsing means including a vacuum tube connected in the primary circuit for impressing on said primary a series of power pulses, the characteristics of said transformer being such that the voltage induced in the secondary in response to a power pulse on said primary is insufficient in magnitude to fire the gap and the voltage induced in the secondary in response to collapse of flux in said primary when said power pulse ceases is of sufficient magnitude to fire said gap.

8. In an electrical discharging apparatus, according to claim 6, wherein the means for causing intermittent discharge across the gap includes a transformer having a secondary connected to the electrode and the workpiece.

9. In an electrical discharging apparatus, according to claim 6, wherein the means for causing intermittent discharge across the gap includes a transformer having a secondary connected to the electrode and the workpiece and a primary to which current is supplied and providing the voltage of lower magnitude the interruption of which causes collapse of the flux in said transformer to provide the discharge across the gap.

10. The improved method of electrical-discharge-machining which comprises, causing intermittent electrical erosive discharge across a gap between a conductive workpiece and an electrode of selected magnitude, frequency and polarity and, between discharges impressing across the gap a voltage of opposite polarity and lower magnitude to repel dislodged workpiece particles.

References Cited in the file of this patent

UNITED STATES PATENTS

| | | |
|---|---|---|
| 1,321,309 | Holslag | Nov. 11, 1919 |
| 1,725,053 | Brown et al. | Aug. 20, 1929 |
| 1,810,212 | Hinds | June 16, 1931 |
| 2,129,899 | Young | Sept. 13, 1938 |
| 2,328,444 | Francis | Aug. 31, 1943 |
| 2,346,975 | Laboulais | Apr. 18, 1944 |
| 2,392,066 | Sargeant | Jan. 1, 1946 |
| 2,490,302 | Holfelder | Dec. 6, 1949 |